US012687267B2

(12) United States Patent
Chan

(10) Patent No.: US 12,687,267 B2
(45) Date of Patent: Jul. 21, 2026

(54) LIGHTING DEVICE

(71) Applicant: Ka Suen Chan, Hong Kong (CN)

(72) Inventor: Ka Suen Chan, Hong Kong (CN)

( * ) Notice: Subject to any disclaimer, the term of this patent is extended or adjusted under 35 U.S.C. 154(b) by 125 days.

(21) Appl. No.: 18/791,666

(22) Filed: Aug. 1, 2024

(65) Prior Publication Data

US 2025/0172263 A1 May 29, 2025

Related U.S. Application Data

(60) Provisional application No. 63/602,512, filed on Nov. 24, 2023.

(51) Int. Cl.

| | |
|---|---|
| ***F21S 8/08*** | (2006.01) |
| ***F21S 4/28*** | (2016.01) |
| ***F21V 5/00*** | (2018.01) |
| ***F21V 17/16*** | (2006.01) |
| ***F21V 19/00*** | (2006.01) |
| ***F21V 21/116*** | (2006.01) |
| ***F21Y 107/40*** | (2016.01) |
| ***F21Y 113/00*** | (2016.01) |
| ***F21Y 115/10*** | (2016.01) |

(52) U.S. Cl.

CPC . *F21S 8/08* (2013.01); *F21S 4/28* (2016.01); *F21V 5/00* (2013.01); *F21V 17/16* (2013.01); *F21V 19/004* (2013.01); *F21V 21/116* (2013.01); *F21Y 2107/40* (2016.08); *F21Y 2113/00* (2013.01); *F21Y 2115/10* (2016.08)

(58) Field of Classification Search

CPC ...... F21S 8/08; F21S 4/28; F21V 5/00; F21V 17/16; F21V 19/004; F21V 19/0055; F21V 21/116; F21Y 2107/40; F21Y 2113/00; F21Y 2115/10; F21Y 2103/10

See application file for complete search history.

(56) References Cited

FOREIGN PATENT DOCUMENTS

CN 207230476 U * 4/2018

OTHER PUBLICATIONS

Machine translation of CN207230476U (Year: 2018).*

* cited by examiner

*Primary Examiner* — Anne M Hines
*Assistant Examiner* — Jose M Diaz
(74) *Attorney, Agent, or Firm* — HOWARD M COHN and Associates, LLC

(57) ABSTRACT

The application discloses a lighting device. The lighting device includes a device body, having a first length in an axial direction; a plurality of lighting components arranged within the device body, wherein the lighting components is configured to emit light outward, such that a lighting area is generated by the lighting components; two support brackets being respectively connected to two ends of the device body in the axial direction; wherein each of the lighting component has different orientations, such that an angular coverage of the lighting area in a circumferential direction is at least 300°.

12 Claims, 6 Drawing Sheets

LIGHTING DEVICE

PRIORITY CLAIM

This application claims the benefit of and priority to Provisional Patent Application No. 63/602,512 filed on Nov. 24, 2023 and entitled "ThinkGrow Inter-Canopy Lighting System" which is hereby incorporated by reference in its entirety.

TECHNICAL FIELD

This application relates to the field of artificial light sources, particularly related to a lighting device.

BACKGROUND

When growing plants indoors or in greenhouses, artificial light sources such as LED lights are commonly used to simulate sunlight, providing sufficient light for plant growth.

Typically, these artificial light sources are hung or arranged at the top of an indoor space to mimic the effects of sunlight as closely as possible and to facilitate control. However, due to factors such as the angle of irradiation and the attenuation of light energy, it is often difficult for light from the top to reach the lower parts of plants, especially in cases where the plants are dense or tall.

To address the issue of insufficient light reaching the lower parts of plants, there are some lights placed within the canopy layer or at lower heights. The lights placed within the canopy layer are used in conjunction with the lights arranged at the top to properly illuminate both the bottom and the top of the plants.

However, these lower-placed lights still have many flaws, failing to fully function effectively in practical applications.

SUMMARY

An embodiment of the application discloses a lighting device. The lighting device includes: a device body; the device body has a first length in the axial direction; multiple lighting components; the lighting components are arranged within the device body and emitting light outward to form a lighting area and two support brackets being respectively connected to the two ends of the device body in the axial direction. Each lighting component has different orientations, so that the angular coverage of the lighting area in a circumferential direction is at least 300°.

One advantageous aspect of the lighting device according to the application is that it can be conveniently placed within the canopy of plants, bringing the light source closer to the plants while comprehensively illuminating both the top and the bottom of the plants. Moreover, the coverage of the lighting area is significantly enhanced, providing sufficient illumination.

BRIEF DESCRIPTION OF THE DRAWINGS

One or more embodiments are illustratively described with corresponding drawings. These illustrative descriptions do not limit the embodiments. Elements with the same reference numeral in the drawings are represented as similar components. Unless specifically stated, the drawings do not constitute a limitation on proportion.

DETAILED DESCRIPTION

The detailed description of this application is provided below in conjunction with specific embodiments. It should be emphasized that the following description is merely illustrative and is not intended to limit the scope of the application or its applications.

It should be noted that unless explicitly defined and limited, the terms "center," "longitudinal," "transverse," "upper," "lower," "vertical," "horizontal," "inner," "outer," and other directional or positional terms used in this specification are based on the directions or positions shown in the attached drawings. These terms are used merely for convenience in describing the application and simplifying the description, and do not imply that the devices or components referred to must have a specific orientation, be constructed and operated in a specific orientation, and thus should not be understood as limiting the application. The terms "mounted," "connected," "linked," "fixed," etc., should be understood broadly, for example, they could mean permanently connected or detachably connected, or integrally connected; they could be mechanical or electrical connections; they could be directly connected or indirectly connected through an intermediate medium. Moreover, the terms "first," "second," etc., are used only for descriptive purposes and should not be construed as indicating or implying relative importance or implicitly indicating the number of technical features indicated; thus, a feature defined as "first," "second," may explicitly or implicitly include one or more such features; "multiple" means two or more; "and/or" includes any and all combinations of one or more of the related listed items. For those skilled in the art, the specific meanings of these terms in this application can be understood based on the circumstances.

The term "axial direction" refers to a direction along the main axis of an object or parallel to its length. The term "circumferential direction" describes a direction along the outer surface of the object around the circumference.

The term "artificial light source" refers to a device or equipment manufactured through technological means, as opposed to natural light sources (such as the sun), used for producing light.

Figure 1:
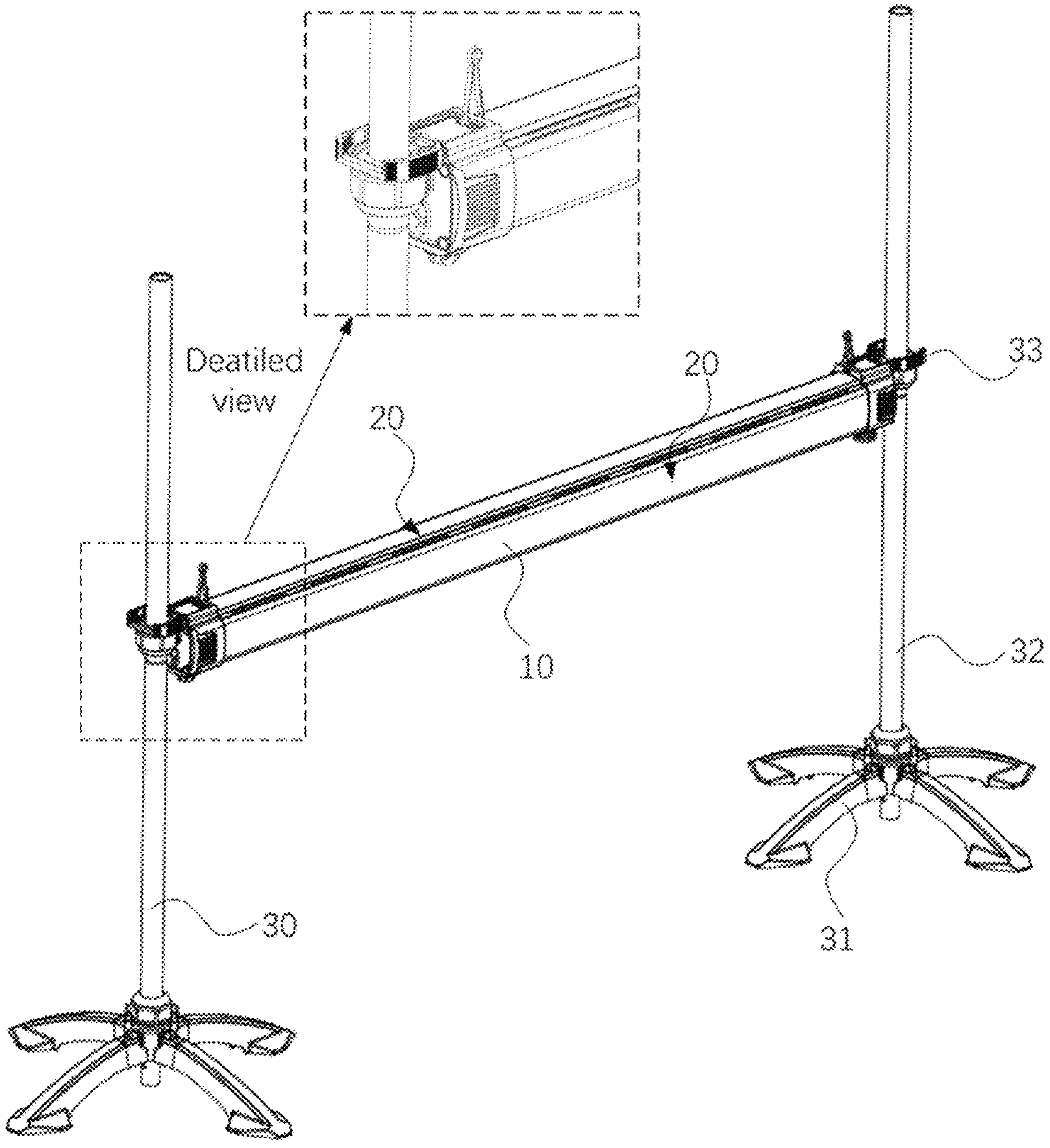
FIG. 1 is a schematic diagram of the structure of the lighting device according to the embodiments of this application.

FIG. 1 is a schematic diagram of the lighting device according to the embodiments of this application. This lighting device is an artificial light source that can be used for indoor or greenhouse plant cultivation, providing adequate light for lower plants.

FIG. 1 exemplarily indicated one lighting device, but those skilled in the art will understand that a complete lighting system can be consisted by combining multiple lighting devices, applicable to specific greenhouses or indoor spaces.

As shown in FIG. 1, the lighting device includes: a device body 10, a lighting component 20 and support brackets 30.

The device body 10 is the main structure of the entire lighting device. It has a first length in the axial direction. This first length can be set according to the needs of the actual situation and is not specifically limited here.

The lighting component 20 is capable of emitting light outward. It can specifically use any appropriate type of component or device according to the needs of the actual situation, including but not limited to LED diodes that can convert electrical energy into light energy.

Continuing with FIG. 1, the lighting component 20 is arranged or housed within the device body 10 and emits light through the translucent part of the device body (for example, a light guide). The area collectively covered by different lighting components 20 arranged within the device body 10 can be collectively referred to as the "lighting area." In other words, plants within the lighting area can be illuminated by the light emitted from the lighting device (in the absence of obstruction).

Figure 3:
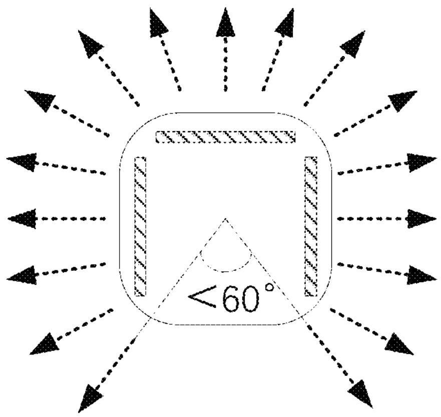
FIG. 3 is a schematic diagram of the angular coverage of the lighting area according to the embodiments of this application.

The lighting components 20 are arranged in different orientations, thereby allowing the collectively formed lighting area to have an angular coverage of at least 300° (for example, as shown in FIG. 3).

In this embodiment, the "orientation of lighting component 20" refers to the direction in which a light-emitting side of the lighting component 20 faces. Typically, the light emitted from each lighting component 20 can illuminate a certain angular range centered on the orientation.

Thus, by setting some light components 20 with different orientations, the angular coverage illuminated by the light can be further expanded to 300° or more. In this embodiment, terms like "angular coverage" are used to indicate the angular range that the light emitted from the device body can illuminate. As shown in FIG. 3, the size of the aforementioned "angular coverage" can be expressed by a percentage of 360°, in the circumferential direction.

Preferably, multiple lighting components 20 can be electrically connected through several short interconnect cables 50 and the power supply can be provided to every lighting component. The "short interconnect cable" refers to a cable with a smaller length, less than a predefined length.

The support brackets 30 are structural components used to support the device body so that it has a suitable height and can be stably placed on support surfaces such as the ground.

To match the device body with the first length, which is relatively long, as shown in FIG. 1, the support bracket 30 can be set with two, each connected to the two axial ends of the device body 10, to provide stable and reliable support.

Specifically, please refer to FIG. 1, the support bracket 30 includes: a bracket base 31, a support rod 32, and a connecting component 33.

The bracket base 31 is the part that contacts the support surface. It can be designed to have a larger contact area or more, widely spaced contact points to provide stable and reliable support. For example, as shown in FIG. 1, the bracket base 31 can have four legs that contact the support surface.

The support rod 32 is a rod-like component extending from the bracket base 31 along the height direction. The specific extension height can be set according to the needs of the actual situation, and is not specifically limited here.

The connecting component 33 connects the device body 10 and the support bracket 30. In addition to being fitted and locked at a specific position on the support rod 32, the connecting component 33 can also be detachably connected to one end of the device body.

Thus, one end of the device body is supported, and through the balanced support force at both ends, the device body can be maintained at a specific height.

In some embodiments, the connecting component 33 can be designed as an adjustable height component. That is, the connecting component 33 has a locked state and an unlocked state and can be fixed at different positions on the support rod by switching between these states, thereby adjusting the distance between the device body and the support surface to meet the usage needs of more different application scenarios.

Figure 7:
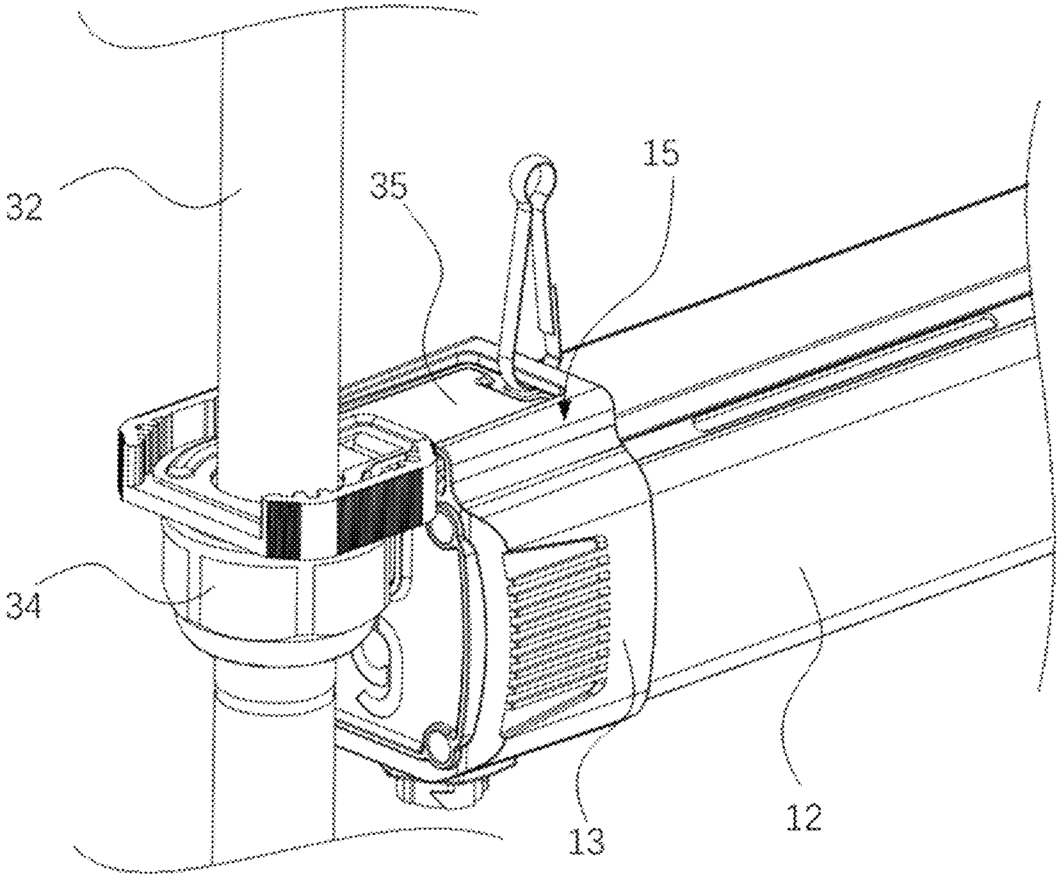
FIG. 7 is a schematic diagram of the connection relationship between the device body and the support bracket according to the embodiments of this application.

For example, as shown in FIG. 7, the connecting component 33 can achieve the switch between locked and unlocked states by tightening or loosening bolts 34.

Figure 2:
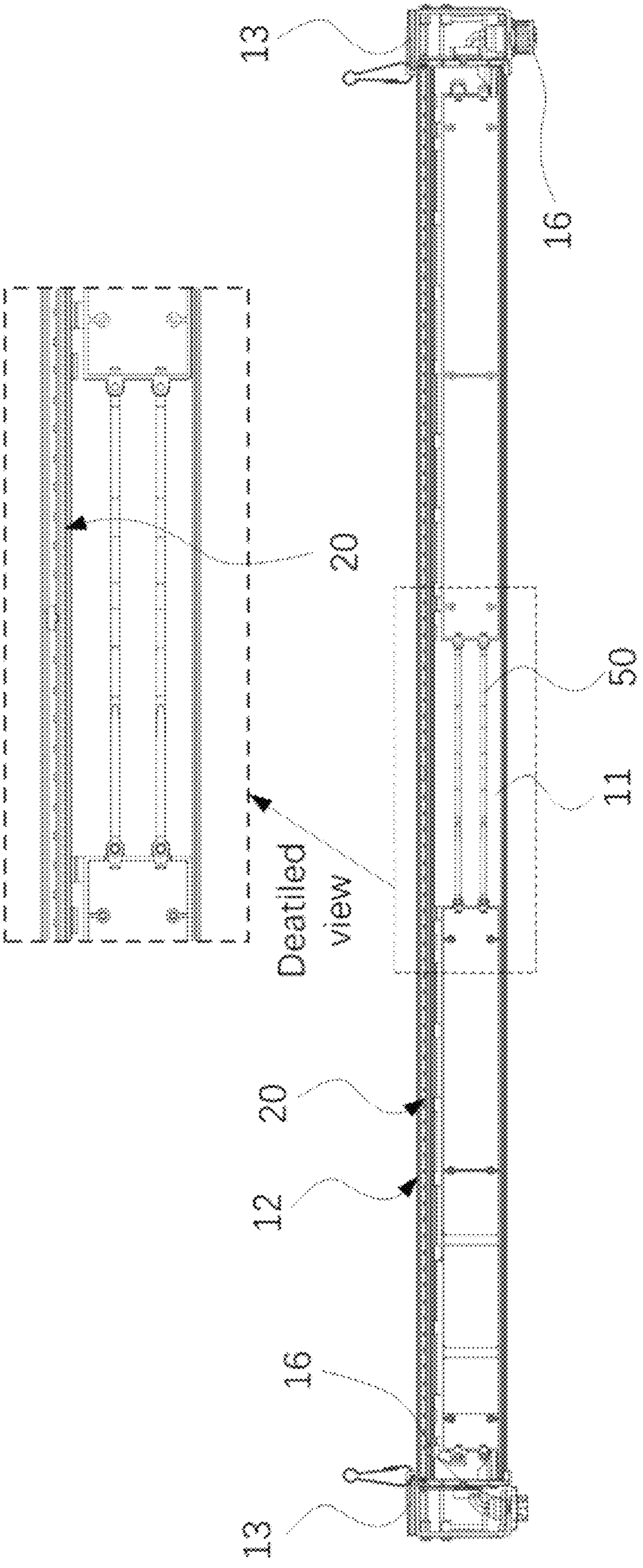
FIG. 2 is a sectional view of the device body according to the embodiments of this application.
Figure 4:
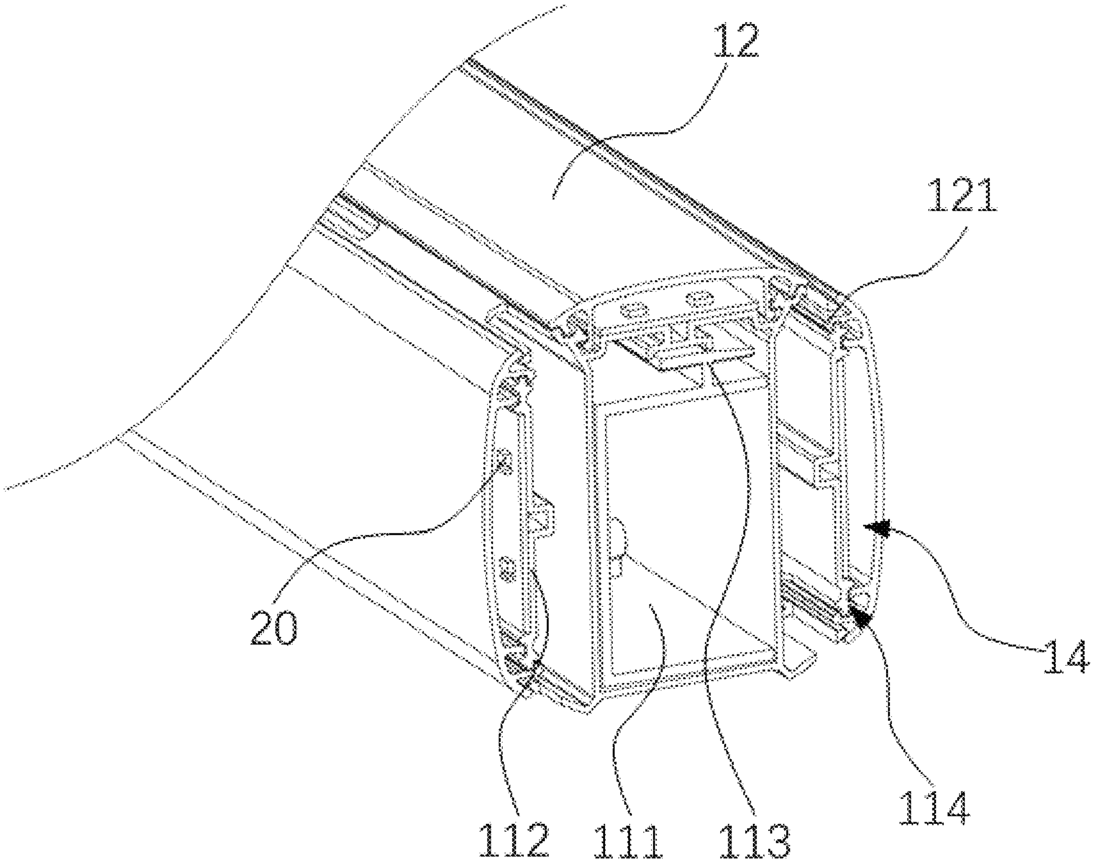
FIG. 4 is a sectional view of the device body from another perspective according to the embodiments of this application.
Figure 5:
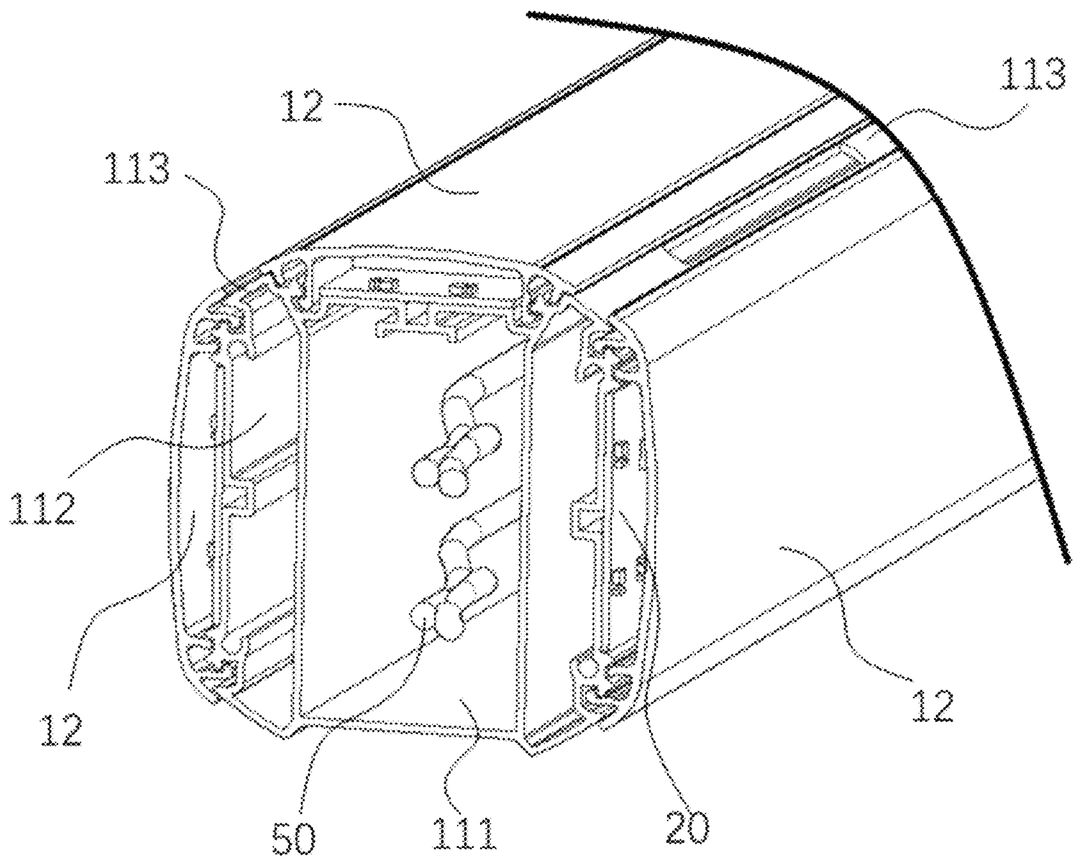
FIG. 5 is a sectional view of the device body from yet another perspective according to the embodiments of this application.

To fully describe the inventive concept of this application, the specific structure of the device body 10 is detailed below. FIGS. 2, 4, and 5 show the cross-sectional views of the device body 10 from different perspectives.

In some embodiments, as shown in FIGS. 2, 4, and 5, the device body 10 includes: a main body frame 11, three light guides 12, and two end structures 13.

The surface of the main body frame 11 have multiple accommodating slots 14 extending axially. The extension length of these accommodating slots 14 can be set according to the needs of the actual situation. For example, the accommodating slot 14 can extend from one end of the main body frame 11 to the other end, having a size roughly equivalent to that of the main body frame 11.

The accommodating slot 14 is provided with a top opening. One lighting component 20 is confined within one accommodating slot 14. In this document, the top opening of the accommodating slot 14 can also be referred to as a "slot mouth."

The light guide 12 is a structural component that guides and allows light to pass through, which can better expand the illumination range of the light produced by the lighting component 20. It can be placed over the slot mouth of the accommodating slot 14, covering above the lighting component 20, thereby performing the light-guiding function.

Specifically, the light guide 12 can be fixedly connected to the main body frame 11 in any suitable type of manner. For example, the light guide 12 can be snap-fitted to the main body frame 11, stabilizing it on the main body frame 11.

The end structure 13 is the part that is fixedly connected to one end of the main body frame 11. It can provide a certain accommodating space for housing other devices such as electrical connectors. For example, each end structure 13 can have an electrical connection interface 16 facing the support surface. Thus, by using connection cables to connect the electrical connection interfaces 16 of the two end structures 13 to a power supply, a complete power circuit can be formed. Optionally, an additional control component can be added to the power circuit to adjust the light intensity of the lighting component 20.

The end structure 13 also has a connection structure which is configured to achieve a detachably fixed connection with the connecting component 33. For example, as shown in FIG. 7, the connecting component 33 has an extending fixed plate 35, while the end structure 13 has an accommodating slot 15 that matches the fixed plate 35. Thus, when the fixed plate 35 passes through the opening of the accommodating slot and is contained inside the accommodating slot 15, the reserved part of the wall at the top of the accommodating slot 15 can abut against the fixed plate 35, restricting the relative movement in the height direction between the end structure 13 and the connecting component 33.

Figure 6:
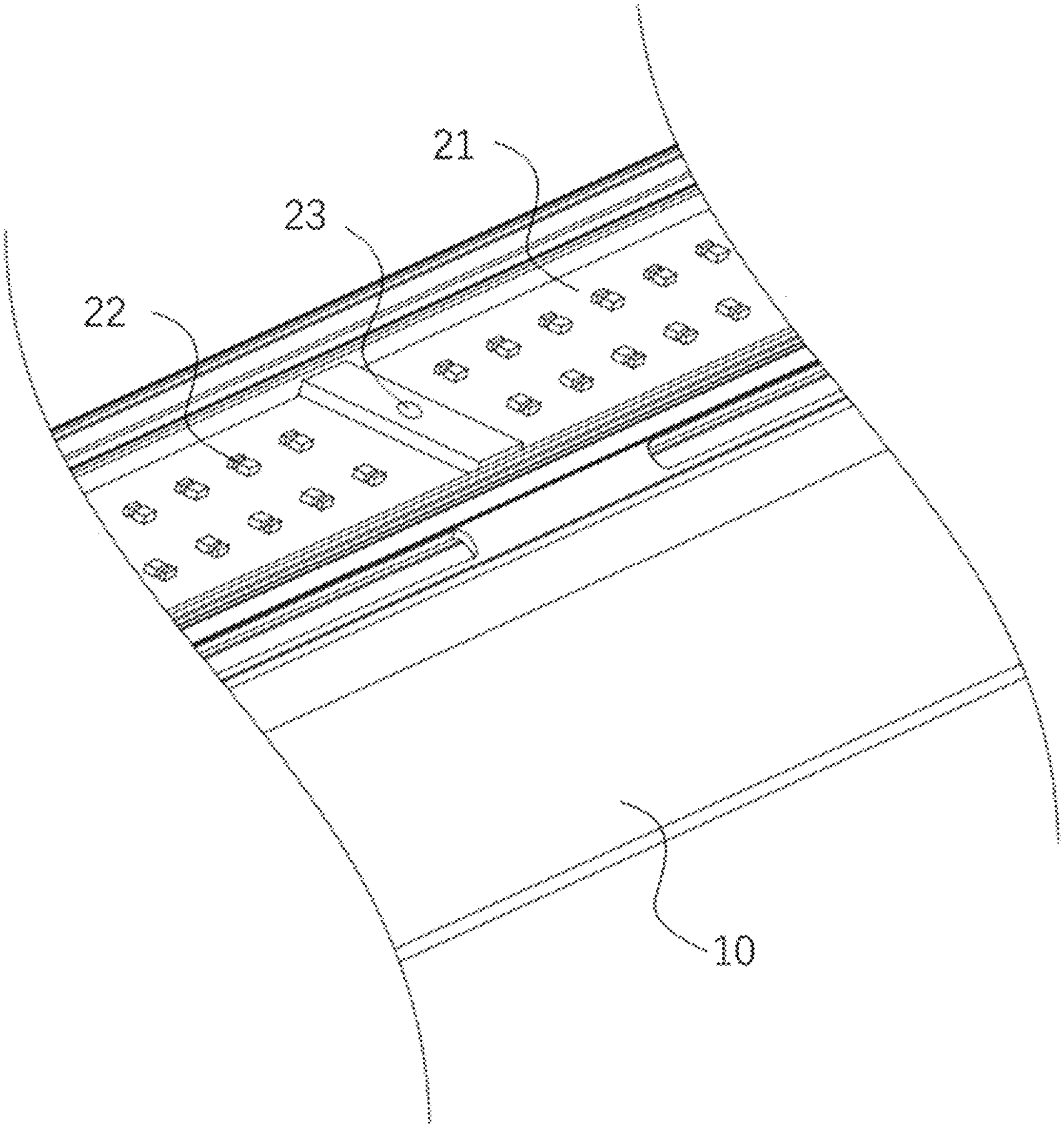
FIG. 6 is a schematic diagram of the device body with at least part of the light guides removed, according to the embodiments of this application.

In some embodiments, as shown in FIG. 6, the lighting component 20 includes a substrate 21 and several LED diodes 22 integrated on the substrate. Accordingly, the accommodating slot 14 can be designed to have a width that matches the substrate 21, to the substrate 21 from shaking.

Further, the substrate 21 can also be detachably locked in the accommodating slot 14 with one or more fasteners 23 (e.g., screws), thereby preventing undesired movement or shaking of the lighting component 20 within the accommodating slot 14.

Please refer to FIGS. 4 and 5, in some embodiments, the main body frame 11 consists of a frame 111, three accommodating components 112, and several extension components 113. These structural components can be integrally formed or rigidly connected together through welding or bonding.

Among them, the frame 111 refers to the rectangular structural part within the main body frame 11. Its interior is hollow, providing space for cables and other devices to run or pass through. Apart from the two axial end surfaces, the frame 111 is enclosed by a bottom surface, a top surface, a first side and a second side.

In this embodiment, the bottom surface refers to the surface close to the support surface, while the top surface is the surface away from the bottom surface. The first side and the second side are two opposite side surfaces.

The accommodating component 112 is the structural part within the main body frame 11 that forms the accommodating slot 14. Three accommodating components 112 are set up on the top surface, the first side and the second side of the frame 111, respectively.

In other words, corresponding lighting components 20 and light guides 12 are set up on the top surface, the first side surface and the second side surface. Compared to traditional lighting devices that only have LEDs on the sides, the lighting device with three lighting components can significantly increase the angle coverage of the illuminated area.

Specifically, each light guide 12 has a predetermined curvature, being arc-shaped, such that the device body is provided with a smoother external contour.

The extension component 113 is connected the accommodating component 112 with the frame 111 and generated a certain gap between the accommodating component 112 and the corresponding frame surface. The extension component 113 can be designed in various structural forms. For example, as shown in FIG. 4, the extension component 113 can be a relatively narrow connecting structure, connecting between the top surface of the frame and the corresponding accommodating component 112, forming a gap between them.

Alternatively, as shown in FIG. 5, the extension component 113 can also be a pair of legs extending outward from the edge of the frame. A pair of legs are connected at the side edges of the accommodating component 112, supporting it to form a gap between it and the first or second side of the frame.

In this embodiment, for ease of description, a top surface of the accommodating component 112, where the accommodating slot 14 is provided, can be referred to as the first surface, while a bottom surface of the accommodating component 112 facing the frame surface can be referred to as the second surface.

Specifically, on the edge of the second surface of the accommodating component 112 or other suitable positions, a step surface 114 extending axially can be provided. The step surface 114 is adapted to have a snap-fit component 121 of the light guide 12. Through the snap-fit of the snap-fit component 121 with the step surface 114, the light guide 12 is detachable connected with the main body frame 11.

Preferably, additional guiding grooves are provided on the accommodating component 112, and the light guide 12 is correspondingly equipped with guiding flanges, which fit together through the guiding grooves and guiding flanges, ensuring that the light guide 12 is accurately snapped onto the main body frame 11.

Compared to traditional lighting devices that only have a light coverage of 240° or less, the application discloses the lighting device offered a wider 300° range of illumination, providing complete lighting for plants. Additionally, each lighting component can be powered via short interconnecting cables, and only one integrated cable assembly is needed to adjust the luminous intensity of all lighting components (from 0% to 100%).

The above content is a further detailed explanation of this application in conjunction with specific/preferred embodiments and should not be construed as limiting the specific implementations to these descriptions. For those skilled in the art, several modifications and improvements can be made without departing from the concept of this application, and these are within the scope of protection of this application.

What is claimed is:

1. A lighting device, comprising:

a device body, having a first length in an axial direction;

a plurality of lighting components arranged within the device body, wherein the lighting components is configured to emit light outward, such that a lighting area is generated by the lighting components;

two support brackets being respectively connected to two ends of the device body in the axial direction;

wherein each of the lighting component has different orientations, such that an angular coverage of the lighting area in a circumferential direction is at least 300°;

wherein the support bracket comprises:

a bracket base contacted a support surface;

a support rod extending along a height direction from the bracket base;

a connecting component fitted on the support rod;

wherein the connecting component is detachably connected to one of the end of the device body in the axial direction; and wherein the connecting component is capable of being fixed at different heights of the support rod to adjust a distance between the device body and the support surface.

2. The lighting device according to claim 1, wherein the device body comprises:

a main body frame provided with a plurality of accommodating slots extending along the axial direction; wherein one lighting component is confined within one accommodating slot;

a plurality of light guides; wherein one light guide covers over one accommodating slot to envelope the lighting component above;

two end structures being respectively fixedly connected to two distant ends of the main body frame in the axial direction;

wherein the end structures are detachably fixedly connected with the connecting components.

3. The lighting device according to claim 2, wherein the lighting component comprises a substrate and several LED diodes integrated on the substrate.

4. The lighting device according to claim 3, wherein the accommodating slot is compatible with the substrate and the substrate is detachably locked and fixed in the accommodating slot by one or more fasteners.

5. The lighting device according to claim 2, wherein the light guide is snap-connected to the main body frame.

6. The lighting device according to claim 5, wherein the main body frame comprises:

an internally hollow frame, wherein the internally hollow frame is rectangular in shape and formed by enclosing a bottom surface, a top surface, a first side and a second side; and the bottom surface is close to the support surface, while the top surface is the surface away from the bottom surface;

three accommodating components being connected to the top surface, the first side, and the second side respectively through three extension components;

wherein one accommodating component is provided with one accommodating slot.

7. The lighting device according to claim 6, wherein the accommodating components have a first surface and a second surface mutually opposed to the first surface, and the accommodating slot is formed on the first surface.

8. The lighting device according to claim 7, wherein two edges of the second surface of the accommodating component are provided with two step surfaces extending along the axial direction and the light guide is provided with a snap-fit, which is engaged with the step surface.

9. The lighting device according to claim 7, wherein the light guide is arc shaped.

10. The lighting device according to claim 2, wherein each end structure is provided with an electrical connection interface facing the support surface.

11. The lighting device according to claim 2, wherein the lighting components are connected by a plurality of interconnecting cables, and the interconnecting cables are less than a predetermined length.

12. The lighting device according to claim 2, wherein the connecting component has a fixing plate extending outward along the axial direction and the end structure is provided with a receiving groove compatible with the fixing plate;

wherein the fixing plate is accommodated in the receiving groove to restrict a relative movement in the height direction between the end structure and the connecting component.

* * * * *